United States Patent [19]

Cannady et al.

[11] 4,361,277

[45] Nov. 30, 1982

[54] PORTABLE VEHICLE TRACTION DEVICE

[76] Inventors: Robert W. Cannady, 4613 Greentree Rd., Wilmington, N.C. 28407; Robert E. Hale, 126 E. Brandywine, Wilmington, N.C. 28405

[21] Appl. No.: 251,083

[22] Filed: Apr. 6, 1981

[51] Int. Cl.³ .............................................. E01B 23/00
[52] U.S. Cl. ...................................... 238/14; 152/228; 188/4 R
[58] Field of Search ............... 238/14; 305/40; 59/78; 198/688, 698; 188/4 R, 32; 152/208, 225 R, 227, 228, 178, 179, 180, 183, 213 R, 213 A

[56] References Cited

U.S. PATENT DOCUMENTS

| | | | |
|---|---|---|---|
| 1,325,575 | 12/1919 | Niewoehner | 238/14 |
| 1,375,666 | 4/1921 | Bauer | 238/14 |
| 1,400,478 | 12/1921 | Deschamps | 238/14 |
| 1,502,123 | 7/1924 | Sall | 238/14 |
| 1,606,622 | 11/1926 | Fogarty | 238/14 |
| 2,433,545 | 12/1947 | Chartier | 152/225 R |
| 4,261,510 | 4/1981 | Andrus | 238/14 |

Primary Examiner—Edward C. Kimlin
Assistant Examiner—Thomas Bokan
Attorney, Agent, or Firm—B. B. Olive

[57] ABSTRACT

An improved traction device for assisting vehicles when stuck in sand, snow, bog, or the like, incorporates a rigid plate having opposed upper and lower gripping ribs and an appended chain structure having transverse angle iron pieces spaced lengthwise thereof.

1 Claim, 5 Drawing Figures

PORTABLE VEHICLE TRACTION DEVICE

DESCRIPTION

TECHNICAL FIELD

The invention relates to portable traction devices for assisting vehicles which have become stuck in sand, snow, bog, or the like.

BACKGROUND ART

A variety of traction devices assist in the removal of vehicles which have become stuck in sand, snow, bog, or the like. A useful background of prior art devices of this type is to be found in prior art U.S. Pat. Nos. 1,325,575, 1,375,666, 1,400,478, and 1,606,622. As can be seen from the mentioned prior art patents, an extensive effort has been made in the past to develop an ideal type of traction mat suited for the many different kinds of situations in which vehicles become stuck such as in sand, snow, bog, or the like. Thus, in spite of the extensive efforts to develop a versatile, portable, traction device suited to a variety of situations such as encountered in sand, snow, bog, or the like, the prior art devices have not yet achieved a completely practical device of this kind. This is evidenced by the fact that such a device is not widely sold or generally made available in automotive supply stores, and the like, on a mass basis.

The object of the present invention thus becomes that of providing a device which improves upon some of the features found in prior art devices, incorporates other features believed to be novel and is aimed at providing a more versatile traction device than has heretofore been available and with a wide range of applications in assisting vehicles in becoming unstuck in sand, snow, bog, or the like.

DISCLOSURE OF INVENTION

The improved traction device of the invention incorporates a rigid plate having upper and lower gripping ribs on opposite sides of the plate and with an appended chain structure made up of two parallel chains with transverse, angle iron traction pieces spaced lengthwise of the chain and welded thereto to provide additional traction once the vehicle wheel has removed itself from the original stuck location. The spacing of the ribs and the orientation of the angle iron pieces are designed so as to insure that the vehicle wheel grips the device of the invention and further insures that the invention device itself grips the sand, snow, or bog material from which the vehicle wheel is being removed.

BEST MODE FOR CARRYING OUT THE INVENTION

Figure 1:
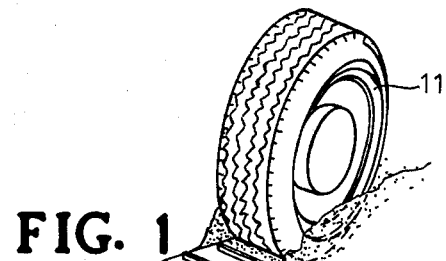
FIG. 1 is a perspective view illustrating a vehicle wheel in use with the traction device of the invention.
Figure 2:
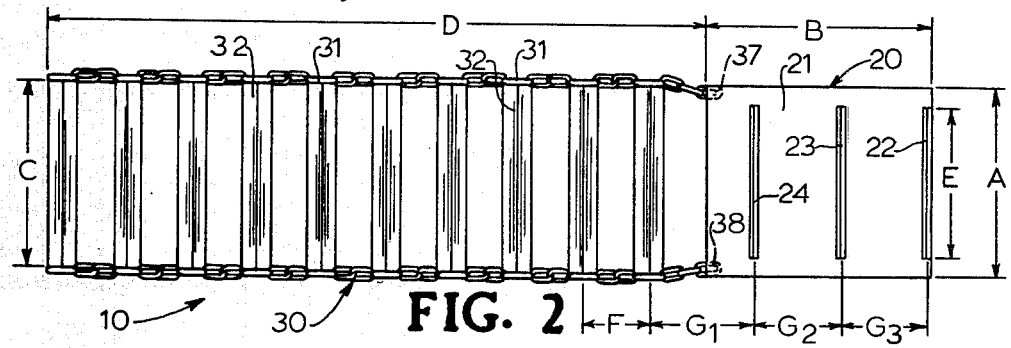
FIG. 2 is a top plan view of the traction device of the invention.
Figure 3:
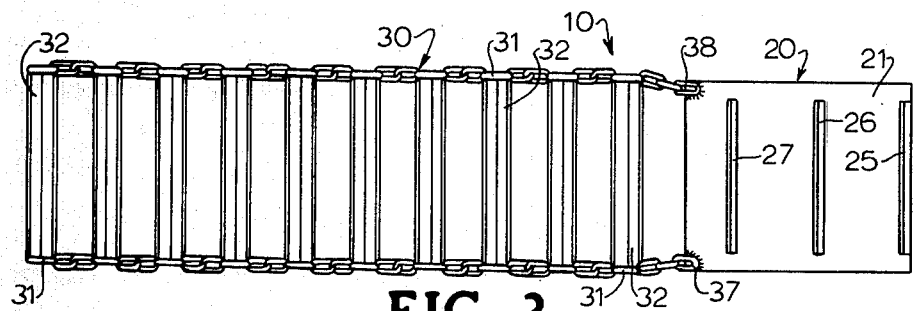
FIG. 3 is a bottom plan view of the traction device.
Figure 4:
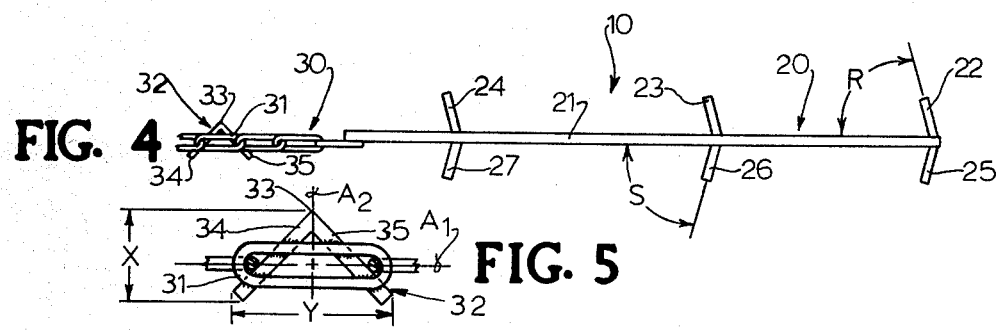
FIG. 4 is a side elevation view of the gripping plate and a portion of the chain structure used in the traction device.
Figure 5:
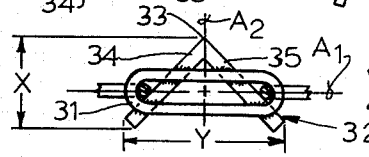
FIG. 5 is an end elevation view of one of the traction bars illustrating how the chain links are welded to the traction bars for purposes of the invention.

With reference to the drawings, the vehicle traction device 10 of the invention comprises a rigid wheel traction plate 20 and a flexible chain-mounted traction mat 30. Wheel plate 20 has a base member 21 formed of a rigid, rectangular, metal plate. Top gripping ribs 22, 23 and 24 are mounted transverse of base member 21, are longitudinally spaced by the equal distances G-2 and G-3 and are angled forwardly at an angle R of approximately 75 degrees. Bottom gripping ribs 25, 26 and 27 are mounted in positions opposite top gripping ribs 22, 23, and 24 and extend transverse of the bottom surface of base member 21 in a longitudinally-spaced relation matching the spacing of top ribs 22-24 and are forwardly angled at an angle S of approximately 75 degrees. Top ribs 22-24, as well as bottom ribs 25-27, are rigidly secured by welding to the respective top and bottom surfaces of base member 21.

The forward angled relation of top ribs 22-24 on base member 121 allows the vehicle wheel 11 to ride easily over the top ribs 22-24 while providing a firm and positive gripping power between wheel 11 and traction plate 20. The forward inclination of the bottom ribs 25-27 allows these bottom ribs to effectively dig into the sand, snow, soil, mud, bog, or the like, in which wheel 11 has become stuck. This effect has been particularly noticed during the initial stages of extrication of wheel 11 when plate 20 typically becomes tilted upwardly as in FIG. 1 so as to change the relative angle of bottom ribs 25-27 relative to the plane of the ground as compared to the angular relations prevailing when plate 20 resides in a flat position on the ground.

The traction mat 30 which is appended to the wheel traction plate 20 is made up of parallel sections of heavy link chain 31 and inverted angle iron members 32. The first such angle iron member 32 is spaced by a distance G-1 from top rib 24 and which is approximately equal to the distances G-2 and G-3. Each angle iron member 32 has a chain link 31 integrally welded thereon along each of its outer ends. Each such link 31 which is welded to an end of an angle iron member 32 is located approximately midway the height X thereof with the overall outside length of each such link 31 being approximately equal to the base dimension Y of the link 31.

The traction mat 30 is used in service with the angle iron members 32 assuming an inverted V position as illustrated. The longitudinal central axis A-1 of each link 31 which is welded to an angle iron member 32 is oriented substantially perpendicular to the central vertical axis A-2 of the angle iron 32. F indicates the distance between the central vertical axes of each pair of angle irons 32. Each apex 33 of each angle iron member 32 provides a positive and effective gripping edge for the vehicle wheel 11 and the leg portions 34, 35 of the angle iron members 32 provide effective ground-gripping means. Also, with the described arrangement, the interior or cavity area of each inverted V angle iron member 32 provides a void for entrapment of the sand, snow, mud, or other substance in which wheel 11 is stuck. For this reason, each angle iron 32 tends to become firmly secured in the ground substance and thus provides an effective gripping edge as each angle iron member 32 comes under the influence of the weight and traction effect of wheel 11.

The rearmost chain links 38, 37 of the link chains 31 are integrally and solidly secured by welding to the front corners of the bottom surface of the base plate member 21 forming wheel plate 20. Thus, the traction mat chain-bar structure 30 becomes permanently but somewhat flexibly secured to the rigid wheel traction plate 20.

In the preferred form as illustrated, the base plate member 21 is formed of 3/32" thick steel plate and is approximately 12" in length B and approximately 10" in width A. The top and bottom rib members 22-27 respectively are each approximately 10" in length C, approximately ¾" in width and approximately ⅛" thick. The equal distances G-1, G-2 and G-3 are approximately 5½". The overall length D of traction mat 30 is approximately 32". Conventional 1" angle iron is employed to make up the top and bottom rib members 22-27 and provides a working height X of approximately ¾" and a working base width Y of approximately 1⅜".

In use, the vehicle operator clears as much as possible of the sand, mud, snow, or other substance involved from directly in front of the wheel 11 which is stuck. For easier installation of the traction plate 20, the operator may find it useful to initially reverse the vehicle and attempt to move wheel 11 backwards for a few inches and place the mat 20 with the vehicle braked and the engine off. After the wheel plate 20 has been placed as far as possible under wheel 11 and with all bystanders safely removed from the immediate area, the operator using the lowest forward gear of the vehicle slightly accelerates the vehicle to cause the vehicle wheel 11 to initially ride out of the stuck position on traction plate 20 and then move the wheel onto traction mate 30. During this extrication process, the bottom ribs 25-27 will tend to dig firmly into the sand, snow, or the like, in which the vehicle wheel 11 is stuck as the plate member 20 is angled upwardly allowing the vehicle wheel 11 to easily ride over and successfully grip the top ribs 22-24. Then as the vehicle wheel 11 progresses forwardly, the ground material will embed itself in the voids provided under each angle iron member 32 as the leg-edge portions 34-35 of the angle iron members 32 firmly grip the ground material whether sand, snow, mud, or the like. After the vehicle wheel 11 has reached a solid support surface, the traction device 10 may be removed and cleaned and stored either by rolling the traction mat 30 around the traction plate 20 or lapping the traction mat 30 back and forth on the traction plate 20 preparatory to storage. Such arrangement provides for compact storage in a suitable container until needed for future use.

In summary, traction device 10 provides an effective means for extricating vehicle wheels stuck in sand, snow, bog, or the like, and is adapted to be made from readily available plate, angle iron, chain and strip materials using conventional welding techniques. Thus, the traction device 10 lends itself to being relatively small in size and yet durable to withstand the stresses experienced during operation of getting a vehicle unstuck. A significant advantage of the traction device 10 of the invention is the fact that none of the parts are required to be specially molded or specially formed thus providing significant cost advantages over many of the known prior art devices. Also, with the illustrated dimensions, the traction device 10 of the invention has been found to be durable and not subject to being bent or distorted when used in conjunction with typical passenger vehicles, pickup trucks, and similar relatively lightweight vehicles. A further advantage resides in the fact that the trailing top and bottom ribs 22, 25 located at the trailing edge of base member 21 provide an immediate gripping edge for the vehicle wheel 11 as well as a gripping edge for the ground substance in which the wheel 11 is stuck immediately upon any amount of the weight of the wheel 11 being placed on the traction plate assembly 20. Then, as more of the weight of traction wheel 11 is placed on the traction plate assembly 20, continuous gripping edges are provided both with respect to the traction wheel 11 as well as with respect to the ground substance in which the wheel 11 stuck. Also, the presence of the exposed bottom edges on the leg portions 34-35 of each angle iron bar 32 provides a series of additional gripping edges for engaging the ground surface.

We claim:

1. A traction device for assisting in the extrication of a vehicle wheel stuck in sand, snow, bog or the like, comprising:
   (a) a traction plate assembly, comprising:
      (i) a rigid, rectangular metal plate providing a base member; and
      (ii) a plurality of pairs of top and bottom rib members formed of rigid metal strips with the top and bottom members of each pair being in aligned opposing positions and securely welded to the respective top and bottom surfaces of said base member in transverse, longitudinally spaced positions with each rib member being angled forwardly and having a length substantially equal to the width of said base member, one pair of said rib members being located proximate the trailing edge of said plate and the forwardmost pair of said rib members being spaced inwardly from the leading edge of said plate; and
   (b) a traction chain-bar structure appended to and providing a continuation of the traction structure provided by said traction plate assembly, comprising:
      (i) a pair of metal chains of equal length and formed of loosely interconnecting links with one end of each said chain being welded to a forward corner on the bottom surface of said base member; and
      (ii) a plurality of cross bars located in substantially evenly and longitudinally spaced positions along the length of said chains and with their central longitudinal axes residing parallel with each other and with the central longitudinal axes of said top and bottom rib members, said cross bars each being formed of strip angle iron and being oriented in an inverted V relation on said chains, each end of each said cross bar being welded to a link of said chain with such link as viewed from one end of such cross bar having its central longitudinal axis perpendicular to a reference line passing through the apex of said cross bar and bisecting a base line passing through the outermost extremities of said cross bar, the trailing one of said cross bars being spaced forwardly of the forwardmost said top rib by a distance substantially equal to the distance between said top ribs.

* * * * *